(12) United States Patent
Haldar

(10) Patent No.: US 10,186,920 B2
(45) Date of Patent: Jan. 22, 2019

(54) SUPER ENERGY EFFICIENT COILS, FANS AND ELECTRICAL MOTORS

(71) Applicant: Sabyasachi Haldar, Kolkata (IN)

(72) Inventor: Sabyasachi Haldar, Kolkata (IN)

(73) Assignee: FREE ELECTRON ELECTRICALS PRIVATE LIMITED, Kolkata, West Bengal (IN)

( * ) Notice: Subject to any disclaimer, the term of this patent is extended or adjusted under 35 U.S.C. 154(b) by 0 days.

(21) Appl. No.: 15/109,447

(22) PCT Filed: May 6, 2015

(86) PCT No.: PCT/IB2015/053293
§ 371 (c)(1),
(2) Date: Jul. 18, 2016

(87) PCT Pub. No.: WO2015/189722
PCT Pub. Date: Dec. 17, 2015

(65) Prior Publication Data
US 2017/0133898 A1 May 11, 2017

(30) Foreign Application Priority Data
Jun. 9, 2014 (IN) .............................. 626/KOL/2014

(51) Int. Cl.
*H02K 3/02* (2006.01)
*H02K 53/00* (2006.01)
(Continued)

(52) U.S. Cl.
CPC ................ *H02K 3/02* (2013.01); *H01B 1/04* (2013.01); *H02K 3/28* (2013.01); *H02K 53/00* (2013.01)

(58) Field of Classification Search
CPC . H02K 3/02; H02K 3/28; H02K 53/00; H01B 1/04
See application file for complete search history.

(56) References Cited

U.S. PATENT DOCUMENTS 4,719,388 A * 1/1988 Oess ..................... H01J 31/126
313/302
5,024,059 A * 6/1991 Noble ................... F04D 23/001
62/3.1
(Continued)

FOREIGN PATENT DOCUMENTS

IN 626/KOL/2014 9/2014

OTHER PUBLICATIONS

U.S. Appl. No. 15/109,447, filed May 6, 2015, Sabyasachi Haldar.

*Primary Examiner* — Michael C Zarroli

(57) ABSTRACT

This invention relates to the development of super energy efficient coils with which different electrical appliances like electric fans and motors can be manufactured, by using New Free Electron Wire. The copper coils of fans and motors can be replaced by closed looped coils of new free electron wire, which will make them highly energy efficient. A very small copper coil wound on New Free Electron Wire will act as a connector which will make the fans and motors as user friendly as that of copper coil fans and motors but will be several hundred times energy efficient than any normal copper coil, fans and motors of its kind, currently available in the market. The replacement of Teflon with Silicon Rubber resolves the problem of joining and molding the body of New Free Electron Wire.

5 Claims, 4 Drawing Sheets

(51) Int. Cl.
    *H01B 1/04*    (2006.01)
    *H02K 3/28*    (2006.01)

(56) References Cited

U.S. PATENT DOCUMENTS

| | | | | |
|---|---|---|---|---|
| 6,465,965 | B2* | 10/2002 | Nelson | F24J 3/00 |
| | | | | 250/305 |
| 6,563,132 | B1* | 5/2003 | Talroze | C08F 8/44 |
| | | | | 257/40 |
| 8,014,068 | B2* | 9/2011 | Cheong | G02B 5/3058 |
| | | | | 359/485.05 |
| 8,885,122 | B2* | 11/2014 | Yoon | G02F 1/13362 |
| | | | | 257/98 |
| 9,307,662 | B2* | 4/2016 | Haldar | H01B 13/00 |
| 2007/0007844 | A1* | 1/2007 | Barbat | H02K 53/00 |
| | | | | 310/208 |
| 2011/0254449 | A1* | 10/2011 | Murnick | H01J 63/02 |
| | | | | 315/111.81 |
| 2013/0098655 | A1* | 4/2013 | Haldar | H01B 13/00 |
| | | | | 174/50.52 |

* cited by examiner

SUPER ENERGY EFFICIENT COILS, FANS AND ELECTRICAL MOTORS

CROSS REFERENCE TO RELATED APPLICATIONS (PRIOR ARTS)

New Free Electron Wire (Indian Patent Application No. 1224/KOL/2011; PCT Application No. PCT/IN2012/000094 & International Publication No: WO2013/042136; US Application No.: 13/583932, USPTO Publication No.: US-2013-0098655-A1 & U.S. Pat. No. 9,302,662 B2; UK Application No.: 1310230.6, UKIPO Publication No.: GB 2499555 A & UK Patent No. GB 2499555): Here in this patent application we have discussed some innovative method to enable the commercial use of new free electron wire. Hence this patent application doesn't deal with the new free electron wire at all but deals with some completely different methods that will enable the commercial use of new free electron wire to develop new kinds of electrical appliances like fans and motors etc. The electrical fans and motors are absolutely that of a new kind in terms of energy efficiency arid method of its winding of coils. The absolutely new kind of winding of coils of the closed looped New Free Electron Wire with a copper coil on its free arm, makes these electrical fans, motors etc. entirely unique. The commercial form of New Free Electron wire contains an entirely new material—Silicon Rubber, that was not mentioned in the previous applications. Hence these methods are completely different from the new free electron wire, that was mentioned in the previous applications. All the above mentioned patent applications have been filed by me as I'm the inventor of, "New Free Electron Wire", by myself.

FIELD OF INVENTION

The invention relates to Solid State Physics, Plasma Physics and Electrical and Electronic Engineering.

STATEMENT OF INVENTION

The entire research and development of this invention has been conducted solely by the inventor i.e. by my-self, alone and entirely privately, by spending money out of my own pocket, without any kind of help from any individual or any organization. The cost of filling the patents was also beard by me, entirely by spending money out of my own pocket.

OBJECT OF INVENTION

This invention is to bring up the design of extremely energy efficient electrical motors by replacing the copper coils of the motors by New Free Electron Wire. These electrical motors will be at least hundreds of times more energy efficient than any other electrical motor of their kind, currently available in the market.

This patent is basically to show innovative methods about how new free electron wire can be used in various electrical devices to make them extremely energy efficient. The use of new free electron wire can also miniaturize electrical appliances to a large extent.

All coils made up of new free electron wire will be far more energy efficient than any other coil made up of any metal. Hence this application may be termed as the commercial Utility Model of the New Free Electron Wire.

BACKGROUND OF INVENTION

The use of New Free Electron Wire in the innovative ways described here in this patent application can make various electrical appliances extremely energy efficient. This New Free Electron Wire can be used in the innovative methods described in this patent application, to manufacture coils with very high energy efficiency. These coils can be used to manufacture very high energy efficient motors, transformers and many other electrical appliances. The performance of these electrical appliances will be very high in terms of energy consumption i.e. they will consume least amount of energy and will do much greater amount of work. As for example very powerful and energy efficient motors can be manufactured by using new free electron wire by using the innovative methods described here.

Then these energy efficient motors can further be used in automobile industry to make absolutely pollution free electric cars, which may in due time replace the fossil fuel cars, over all. The use of these wires to create the motors of automobiles will make them as powerful as fossil fuel cars but extremely energy efficient i.e. these cars will be very fuel efficient or in other words comparatively much smaller batteries can be used to drive even huge vehicles like ten wheelers to drive for long distances without recharging the batteries. Also these highly energy efficient motors can be used to develop very small but extremely energy efficient electric motors that can be used to replace fossil fuel engines of aircrafts. This will enable to manufacture battery driven aircrafts at a commercial level.

Also new free electron wires can be used by using the same or slight modification of the methods described here, for devices where very high electromagnetic fields are required like MRI machines in medical field etc. The use of new free electron wire to manufacture fans and motors can also miniaturize them to a large extent.

Hence the technology of the New Free Electron Wire along with the innovative methods described here will not only enable various industries to manufacture extremely energy efficient electrical appliances but will also help to reduce environmental pollution radically by making human civilization least dependent on fossil fuels. Hence these technologies will lead a Way for the development of pollution free, clean energy using and extremely energy efficient, better human civilization, thus making the entire planet Earth a far better and healthy place to live in.

BRIEF SUMMERY OF THE INVENTION

Here its shown and proved scientifically that any coil made up of New Free Electron Wire will be far more energy efficient than any other coil made up of any metal wire of nearly the same gauge as that of the vacuum cylindrical core of new free electron wire.

Special designs will be necessary to manufacture different types of new free electron wire for different uses. Different sets of materials needs to be used to manufacture new free electron wire according to its use. Here we will mainly discuss the innovative methods of how we can use new free electron wire to manufacture ceiling fans, single phase motors and multi phase motors.

While using new free electron wire one thing needs to be followed always that no matter where and how the new free electron wire is used, it should be used in such a way that finally the wire forms a closed loop. Electrical energy needs to be delivered in the free electron wire and can be recollected from the wire by the method of induction, avoiding any direct contact with the free electrons inside the wire. For this copper coils may be used to deliver energy to the free electrons inside the new free electron wire. Any electrical or electronic device such as a capacitor, if needs to be attached, can be attached with this copper coil. We will see in the detailed description along with the drawings, how this can be done.

We know that the armature of a ceiling fan remains fixed and the body with the magnetic element rotates. As the ceiling fan functions in a single phase, hence to develop a phase shift to generate a torque to make the fan rotate, a capacitor with the starting coil of the fan needs to be connected to develop that phase shift of the current. Hence a combination of small copper coils along with the use of new free electron wire in the innovative ways, can make the fan very highly energy efficient. The same process can be used for all other motors.

The capacitor [7], to develop a phase shift of the current with respect to the current flowing through the running or primary coil [3], is connected with the copper coil [6] to deliver electrical energy to the free electrons at the core of the starting or auxiliary coil [4].

Figure 4:
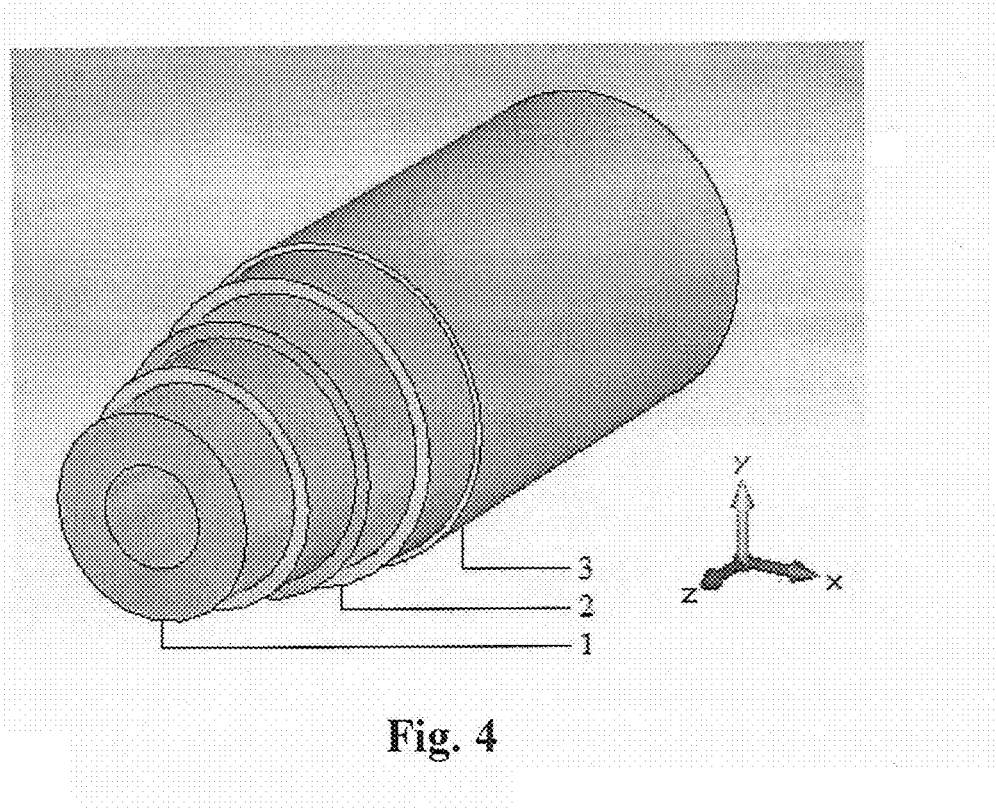

FIG. 4: Shows the materials in actual sequence to be used to make the body of the New Free Electron Wire. The inner most layer pointed as number 01 is of Silicon Rubber, the layer pointed as 02 is of Silicon Oxy-Nitride ($SiO_2$—$Si_3N_4$—$SiO_2$) or Silicon Dioxide ($SiO_2$) or Silicon Nitride ($Si_3N_4$) or Ceramic Materials or Polymers or Dielectric Material. The layer pointed as number 03 is a metallic encapsulation.

DETAILED DESCRIPTION OF THE INNOVATIVE METHODS, WITH REFERENCE DRAWINGS AND EXAMPLES

We have found that the energy efficiency of the new free electron wire is much more, than any metal wire of its kind, presently available in the market. To taste that we will take the example of two identical, wires, one of metal and another one of new free electron wire and will compare their energy efficiency. We know that the body of the new free electron wire will contain mainly layers of Silicon Oxy-Nitride ($SiO_2$—$Si_3N_4$—$SiO_2$), Silicon Dioxide ($SiO_2$), Silicon Nitride ($Si_3N_4$), Ceramic Materials, Polymers and Dielectric Material and Polytetrafluoro ethylene (PTFE), Perfluoro alkoxy (PFA), Fluorinated ethylene (FEP), Silicon Rubber.

We know that the dielectric strength of PTFE is around 60 MV/m or $60 \times 10^6$ V/m. We will try to find out a probable sample of new free electron wire that may be practically used for the winding of various electrical appliances. Also we will take a general example of a normal ceiling fan and discuss its construction in details. We will mainly concentrate on the construction and connection of the coils of the ceiling fan. We will also finally calculate the amount of electrical energy that this new type of ceiling fan will consume in comparison to any other ceiling fan of its kind, presently available in the market.

Let the diameter of the vacuum core of the new free electron wire, that will be used for winding, be 0.5 mm=0.05 cm=0.0005 m.

Let the first layer or the inner most layer be of 1 mm thickness and made up of Polytetrafluoro ethylene (PTFE) or Perfluoro alkoxy (PFA) or Fluorinated ethylene (FEP) or Silicon Rubber.

Let the second innermost layer be of 10 to 15 nanometre thick and made up of Silicon Oxy-Nitride ($SiO_2$—$Si_3N_4$—$SiO_2$) or Silicon Dioxide ($SiO_2$) or Silicon Nitride ($Si_3N_4$) or Ceramic Materials or Polymers or Dielectric Material.

Let the third inner most layer be of 0.5 mm thickness and made up of Polytetrafluoro ethylene (PTFE) or Perfluoro alkoxy (PFA) or Fluorinated ethylene (FEP) or Silicon Rubber.

Let the fourth inner most layer be of 10 to 15 nanometre thickness and made up of Silicon Oxy-Nitride ($SiO_2$—$Si_3N_4$—$SiO_2$) or Silicon Dioxide ($SiO_2$) or Silicon Nitride ($Si_3N_4$) or Ceramic Materials or Polymers or Dielectric Material.

Let the final or the fifth innermost layer be of 0.5 mm thickness and made up of non-magnetic metals or alloys, as for example, may be that of copper or aluminium.

In total the cross sectional diameter or the thickness of the wire will be 3 mm and 20 to 30 nanometre or 3.00002 mm to 3.00003 mm.

Here one point must be noted that the materials described in the particular sequence in, here for the alternate layers of the body of the new free electron wire can be changed according to the use of the wire.

Let the dimension of each of the core on which the winding is to be made be of 3 cm/3 cm/3 cm. So the perimeter of the core is $2\times(3+3)$ cm=12 cm. There are 16 small individual coils to make up the total running coil and 16 small individual coils to make up the total starting coil. So the total parameter available for winding the new free electron wire is $16\times12$ cm=192 cm. We have taken a sample of new free electron wire of thickness 3 mm. Hence within 3 cm there can fit 30 mm/3 mm=10 loops of new free electron wire. Thus in 3 cm height there can fit 10 layers of winding. Thus there can be 100 turns in each individual coil. Hence the total length of each running [3] and starting coil [4] will be $100\times192$ cm=19200 cm=192 m.

So the total volume of the vacuum space available for free electrons will be—

$$\Pi \times (0.05)^2 \times 19200 = 150.72 \text{ cc} = 1.507 \times 10^{-4} \text{ m}^3 \qquad (i)$$

Now, let's find out the amount of charge that can create the electric field that we have considered above as the dielectric strength of Teflon. For that we know—

$$\text{Total charge } Q = \int \underline{dq} = \rho \times \int \underline{dv} = \rho \times \prod \times r^2 \times \int_0^{192} dh \qquad \text{(ii)}$$

Total electric field on the wall of the new free electron wire due to the free electrons inside the core is—

$$E_T = \int \underline{dE} = \frac{1}{4 \times \prod \times \varepsilon} \times \frac{\rho}{r^2} \times \int_0^{192} d(\prod \times r^2 \times h) \qquad \text{(iii)}$$

$$E_T = \int \underline{dE} = \frac{\prod \times r^2}{4 \times \prod \times \varepsilon} \times \frac{\rho}{r^2} \times \int_0^{192} dh$$

$$60 \times 10^6 = (8.99 \times 10^9) \times \prod \times \rho \times [h]_0^{192}$$

$$\rho = 1.11 \times 10^{-5} \text{ coulomb} = 6.91 \times 10^{13} \text{ electrons}$$

Thus the charge density of free electrons per cubic metre in the vacuum space of the new free electron wire is $1.11 \times 10^{-5}$ coulomb $= 6.91 \times 10^{13}$ electrons/m$^3$. This charge density can be termed as a constant for TEFLON.

The total charge required for a given length of the free electron wire, keeping the cross sectional diameter of the wire constant, can simply be calculated by multiplying the charge density '$\rho$' with the length of the free electron wire. This data will turn out to be very useful for various kinds of windings, where just varying the length of the wire, the purpose of finding the total charge may be solved. For the situation considered in here the required length is 192 m. Thus total amount of charge and hence the total number of electrons is $\rho \times 192 = 2.13 \times 10^{-3}$ coulomb $= 1.33 \times 10^{16}$ electrons.

We also know that 1 ampere of current is the flow of $6.241 \times 10^{18}$ electrons through unit area per second. Hence flow of $1.33 \times 10^{16}$ electrons is equivalent to $2.13 \times 10^{-3}$ ampere of current.

Now, we will try to compare the magnetic field generated by a copper wire and that of a new free electron wire and thus will try to find out their energy efficiency. The resistance of the wire is such that 1 ampere of current flows though the conductor and we apply 230 volt across the conductor to make the 1 ampere current flow through the conductor. Then by using 230 watt of current the magnetic field (B) generated around the wire is—

$$B = \frac{\mu_0 I}{2 \pi r} \qquad \text{(iv)}$$

where—
B=is the required magnetic field
$\mu_0$=permeability of free space=$4\Pi \times 10^{-7}$ Tesla m/A
I=the current flowing through the wire=1 A
r=the distance from the wire=0.1 m=10 cm $$B = \frac{(4\Pi \times 10^{-7}) \times 1}{2\Pi \times 0.1}$$

$$= 2 \times 10^{-6} \text{ Tesla}$$

$$= 0.02 \text{ gauss}$$

Now let's find out the magnetic field generated by new free electron wire. We also know that—

$$B = \frac{\mu_0}{4\Pi} \times \frac{q \times v \times r^\wedge}{r^3} \qquad \text{(v)}$$

Where—
$\mu_0 = 4\Pi \times 10^{-7}$ Tesla m/A
q=the amount of charge=1 coulomb
v=velocity of free electrons=$10^8$ m/sec
r$^\wedge$=angle between 'v' & 'r'
r=distance=10 cm=$10 \times 10^{-2}$ m $$B = \frac{\mu_0}{4\Pi} \times \frac{q \times v \times \sin\theta}{r^2}$$

[here $\theta = 90°$, hence $\sin\theta = 1$]

We will consider the same amount of current flows through the New Free Electron Wire i.e. 1 ampere or 1 coulomb of charge in 1 second through unit area. We will take the distance r=0.1 m for the ease of our calculation. Thus we can rewrite the formula as below—

$$B = \frac{\mu_0}{4\Pi} \times \frac{q \times v}{r^2}$$

$$= \{10^{-7} \times (1) \times (10^8)\} / (0.1)^2$$

$$= 1000 \text{ Tesla}$$

$$= 1 \times 10^7 \text{ gauss}$$

Here we have considered the velocity of electrons to be ⅓ that of the velocity of light. Let's see what will be the electric field required to give each electron the velocity that we have considered.

Now from Newton's laws of motion $$v = u + at \qquad \text{(vi)}$$

where—
v=final velocity=$10^8$ m/sec
u=initial velocity=0
a=acceleration
t=time=1 sec.
Thus, $10^8 = 0 + a(1)$
$a = 10^8$ m/sec$^2$
Again we know: Force(F)=mass(m)×acceleration(a)

$$\text{Or } F = m \times a \qquad \text{(vii)}$$

F=$(9.12 \times 10^{-31}) \times (10^8)$
F=$9.12 \times 10^{-23}$ newton
We know, force on each electron due to this electric field is, F=qE
Where—
F=is the above calculated force
q=is the charge of an electron
E=is the calculated electric field
So, $9.12 \times 10^{-23} = (1.602 \times 10^{-19}) \times E$
Or E=$(9.12 \times 10^{-23})/(1.602 \times 10^{-19}) = 5.7 \times 10^{-4}$ volt/meter
One point must be noted here carefully and that is, in case of new free electron wire the magnetic field is generated by 1 coulomb of charge moving at a velocity of ⅓ of the velocity of light. The total magnetic field is produced by the cumulative contribution of each electron. Hence the electric field required to move each electron at the velocity of ⅓ of that of light, has been calculated.

If we consider that we have taken the length of the copper wire to be 1 m and has chosen the gauge or cross section of the copper wire in such a way that there flows a current of 1 ampere along this 1 m long copper wire by an application of 230 volt then we have seen before that the copper wire produces a magnetic field of $2 \times 10^{-6}$ Tesla=0.02 gauss at a distance of 10 cm around it, by consuming 230 watt of electricity.

On the other hand we see from the above calculation that the same 1 metre long new free electron wire can produce a magnetic field of 1000 Tesla when 1 coulomb of charge flows in 1 sec along the length of the new free electron wire of 1 meter when we apply an electric field of $5.7 \times 10^{-4}$ volt/meter. Thus we can consider safely that we have applied a potential difference of $5.7 \times 10^{-4}$ volt across the 1 meter long free electron wire. This made a flow of 1 coulomb of charge along the length of 1 meter of the new free electron wire in 1 second, thus by letting the flow of 1 ampere of current along the length of the new free electron wire. Hence just by consuming $5.7 \times 10^{-4}$ volt×1 ampere=$5.7 \times 10^{-4}$ watt of electricity, New Free Electron Wire produces 1000 Tesla of magnetic flux around it at a distance of 10 cm. Hence we can conclude that New Free Electron Wire is $1000/(2 \times 10^{-6})=5 \times 10^{8}$ times more energy efficient than any metal wire of its kind.

As we know that we cart define resistivity of a material by the scattering of electrons. More the scattering, the higher is the electrical resistance. Thus the mean free path available to the free electrons of the New Free Electron Wire is as below:

We know—

$$\lambda = \frac{RT}{\sqrt{2}\, \pi d^2 N_A P}$$

Where—$\lambda \rightarrow$Mean free path available to the free electrons of the New Free Electron Wire.
R→Universal Gas Const.=8.3145 J/mol K
T→Temperature in Kelvin=303.15 K=30° C.
d→kinetic diameter of nitrogen molecule=3.64 pm=$3.64 \times 10^{-10}$ m
$N_A$→Avogadro No.=$6.022 \times 10^{23}$ replaced by $10^{15}$, due to low pressure.
P→Pressure=$10^{-6}$ mmHg=$1.33 \times 10^{-5}$ Pa=$10^{-7}$ torr
$\lambda = (8.3145 \times 303.15)/\{\sqrt{2} \times \pi \times (3.64 \times 10^{-10})^2 \times 10^{15} \times 10^{-6}\} = 4.28 \times 10^{12}$ m=$4.28 \times 10^{9}$ Km

[Here Avogadro No. of molecules is replaced by the number of molecules ($10^{15}$) because of the low pressure of $10^{-6}$ mmHg=$10^{-7}$ ton. Also here we have replaced the air at the core of the New Free Electron Wire with gaseous Nitrogen at room temperature, while creating vacuum]

From the above calculated mean free path for the free electrons of the New Free Electron Wire, we can conclude that the free electrons present inside the core of the New Free Electron Wire can be mobilized almost without any collision at room temperature and at a pressure of $10^{-6}$ mmHg=$10^{-7}$ torr, for hundreds of kilometres.

Now, let's calculate the conductivity and hence the resistivity of the New free Electron Wire:—
We know that electrical conductivity of any material can be calculated quantitatively by using the formula:

$$\sigma = \frac{ne^2 \ell}{m_e v_{rms}}$$

Where—
σ=electrical conductivity [S/m]
n=density of free electrons [e/m$^3$]=$6.91 \times 10^{13}$
e=charge of an electron ($1.60 \times 10^{-19}$ C)
$m_e$=mass of an electron ($9.11 \times 10^{-31}$ kg)
$v_{rms}$=root-mean-square velocity of electrons [m/s]=$3.45 \times 10^{-9}$ m/sec
l=mean free path length [m]=$4.28 \times 10^{12}$ m=$4.28 \times 10^{9}$ Km

[Here one point must be noted that the velocity of free electrons taken here, was calculated in the previous paper titled, "New Free Electron Wire"]

$$\sigma = \{(6.91 \times 10^{13}) \times (1.602 \times 10^{-19})^2 \times (4.28 \times 10^{12})\} /$$
$$\{(9.11 \times 10^{-31}) \times (3.45 \times 10^{-9})\}$$
$$= 2.415 \times 10^{27}\, \text{S/m}$$

Hence, resistivity ρ=$4.14 \times 10^{-28}$ Ω.m
This very high value of conductivity and extremely low value of resistivity conclusively proves that New Free Electron Wire is capable of utilizing electrical energy and energy in various other forms in a loss free way, thus making electrical appliances extremely energy efficient.

Now, we will take the general example of a high speed 48 inch ceiling fan. We know on an average a domestic, high speed 48" ceiling fan consumes at about 75 watt of current.

We know that—

Watt (W)=volt (V)×ampere (A)　　　　　　　　(ix)

Thus the amount of current consumed by the fan will be—
Or A=W/V
Or A=75/230=0.33 A Our aim is to make this sample ceiling fan highly energy efficient. Thus we will try to find out if we can drive the fan by supplying only less than 1 watt of electricity.

Let's consider that the running or primary coil [3] of the ceiling fan has 16 individual coils. On an average each coil has 500 turns approximately. Now let's see the magnitude of the magnetic field generated by each coil of the fan at normal condition.

We know—

B=k×μ$_0$×n×I　　　　　　　　(x)

Where—
μ$_0$=permeability of free space=$4\Pi \times 10^{-7}$ Tesla m/A
k=relative permeability of the iron core of the fan=200
n=number of turns=500
I=current flowing through the coils=0.33 A $$\text{Or } B = 200 \times 4\Pi \times 10^{-7} \times 500 \times 0.33$$
$$= 0.0415\, \text{Tesla}$$
$$= 414.48\, \text{gauss}$$

We know that there are on an average 16 running coils [3] and 16 starting coil [4]. So in total we will consider that there are 32 coils. So in total these 32 coils will generate—

0.0415×32=1.328 Tesla

Now, we will try to find out the nature of the copper coil through which we can deliver electrical energy to the free electrons of the new free electron wire and thus will find out the required electrical energy to drive the fan.

We have considered the velocity of electrons to be $10^8$ m/sec. Now as we have applied A.C. to the input coil and thus the current will obviously make the electrons move to and fro. Say for the 1st 5 millisecond the electrons will accelerate in the positive direction of the X-axis then for the 2nd 5 millisecond they will decelerate, but will still keep moving in the same positive direction of the X-axis and will come to rest finally. Then when the A.C. will start flowing in the negative direction of its cycle, the electrons will start moving in the reverse direction in the same way mentioned above. Thus the force required to set each electron in the above velocity is—

$$F = m \times a \quad \text{(xi)}$$
$$= (9.12 \times 10^{-31}) \times (2 \times 10^{10})$$
[here acceleration $(a) = 10^8$ meter per second/(5/1000)second]
$$= 1.824 \times 10^{-20} \text{ newton}$$

We know, force on each electron due to this electric field is, F=qE
Where—
F=is the above calculated force
q=is the charge of an electron
E=is the calculated electric field
So, $1.824 \times 10^{-20} = (1.602 \times 10^{-19}) \times E$
Or $E = (1.824 \times 10^{-20})/(1.602 \times 10^{-19}) = 0.114$ volt/meter We have calculated the maximum strength of the magnetic field required to drive the fan. Now let's find out the amount of charge required to generate that magnetic field if the velocity of the electrons is $10^8$ m/sec. Thus by applying the equation—

$$B = \frac{\mu_0}{4\Pi} \times \frac{q \times v \times \hat{r}}{r^3} \quad \text{(xii)}$$

Where—
$\mu_0 = 4\Pi \times 10^{-7}$ Tesla m/A
q=the required charge
v=velocity of free electrons=$10^8$ m/sec
$\hat{r}$=angle between 'v' & 'r'
r=distance=1 cm=$1 \times 10^{-2}$ m
B=1.328 Tesla $$B = \frac{\mu_0}{4\Pi} \times \frac{q \times v \times \sin\theta}{r^2}$$

[here $\theta = 90°$, hence $\sin\theta = 1$]
Thus we can rewrite the formula as below—

$$B = \frac{\mu_0}{4\Pi} \times \frac{q \times v}{r^2} \text{ or }$$
$$q = \frac{B \times r^2}{v \times \mu_0}$$
$$= 1.328 \times 10^{-3} \text{ coulomb}$$

Above, we have calculated the required electric field, 0.114 volt/meter to set each electron, at a velocity of $10^8$ meter/second. As, we will apply A.C. of 50 Hz across the copper coil, thus by using Faraday's Law we will try to find out what will be the induced e.mf. ($\xi$) in the region inside the tube covered by the In Put copper coil. From Faraday's Law we know that if there is a magnetic flux ($d\Phi_B/dt$) through a coil of 'N' turns then the induced e.m.f. in the coil is:

$$\xi = -N(d\Phi_B/dt) \quad \text{(xiii)}$$

We can also modify the above equation to find out what will be the electric field due to changing magnetic field and the expression for that is:

$$\oint E \cdot ds = -(d\Phi_B/dt) \quad \text{(xiv)}$$

From this relation we will find out the flux and hence find out the influence due to this varying magnetic flux on each electron. Here we will take the area of an electron as we want to calculate the influence due to this flux on each electron. We know that the radius of an electron is ($2.5 \times 10^{-14}$) meter. We will take the circumference of an electron for $\oint ds$ so that we get to know the influence of the changing magnetic flux due to the In Put copper coil(A) on each electron. So the circumference of an electron is $2 \times \Pi \times (2.5 \times 10^{-14}) = (1.6 \times 10^{-13})$ m.

So from Faraday's equation we get $$d\Phi_B/dt = -E \oint ds$$
$$= (0.114) \times (1.6 \times 10^{-13})$$
$$= 1.824 \times 10^{-14} \text{ Weber (Wb)}$$

As we have applied 50 Hz A.C. across the copper coil, hence we will get the maximum current through the coil at 5th millisecond=5/1000 second=0.005th second. Thus the will generate maximum magnetic field at 05th millisecond which is—

$$B = \frac{1.824 \times 10^{-14}}{(0.005)}$$
$$= 3.648 \times 10^{-12} \text{ Tesla}$$

(we know weber (Wb)=$T.m^2$. Here, $m^2=0.005$ or $m=0.07$ or m=7 cm)

Now lets find out the nature of the copper coil to be wound over the free space on an exposed arm of new free electron wire to deliver electrical energy to the free electrons of the free electron wire and hence find out the electrical energy that will drive the fan. We will also compare our calculated energy to find out whether we have really made the fan energy efficient.

Thus by applying the equation—

$$B = \mu_0 \times (N/L) \times I \quad \text{(xiv)}$$

Where the coils have—
N=100 turns
I=Current flowing through the coils
L=Length of the coil=5 cm=50 mm=0.05 m
$\mu_0 = 4\Pi \times 10^{-7}$ Tesla m/ampere
B=The calculated magnetic field=$3.648 \times 10^{-12}$ Tesla
Thus we can re-write the equation to find the current (I)

$$I = \frac{B}{\mu_0} \times (L/N)$$
$$= \frac{3.648 \times 10^{-12}}{4 \times \Pi \times 10^{-7}} \times \frac{1}{2000}$$
$$= 1.45 \times 10^{-9} \text{ ampere}$$

Thus if only the above calculated current changes at 230 volt A.C. applied across the copper coil, then the copper coil will generate a changing magnetic field of maximum strength $3.648 \times 10^{-12}$ Tesla or will develop a flux of $1.824 \times 10^{-14}$ Weber (Wb) according to the 50 Hz frequency of the A.C. thus in turn, producing, the required electric field of 0.114 volt/meter to set the free electrons of the New Free Electron Wire into a vibrating motion with maximum velocity of $10^8$ meter/second.

Thus, if we take the gauge of the copper wire to let the above calculated current flow though the coil when we will apply a 230 volt A.C. across the coil then the electrical energy required in watts to drive the fan is $3.33 \times 10^{-7}$ watt. Thus we can conclude safely that the consider ceiling fan in here as an example will be $2.25 \times 10^8$ times more energy efficient if its copper coil is replaced by new free electron wire.

Method for manufacturing, "Energy Efficient Fans and Motors" comprises:—

(a) All usual components of the ceiling fan or motor will remain as usual except that the copper coils or any metal wire coil will be replaced by the new free electron wire coil.

(b) Number of turns of all coils of the new free electron wire at the stator or armature in the running and starting coil in case of energy efficient fans will depend on the size of the groves to wind the coils and will also depend on the power of the fans and the motors or on their energy consumption. For example a 10 horse power motor will need more number of turns than an one hose power motor.

(c) The amount of charge at the vacuum space at the core of the new free electron wire will determine the energy efficiency of the new free electron wire and hence the energy efficiency of the fans and motors directly. This means more the free electrons or charged particles at the core of the new free electron wire more will be the energy efficiency of the fans and motors.

Figure 2:
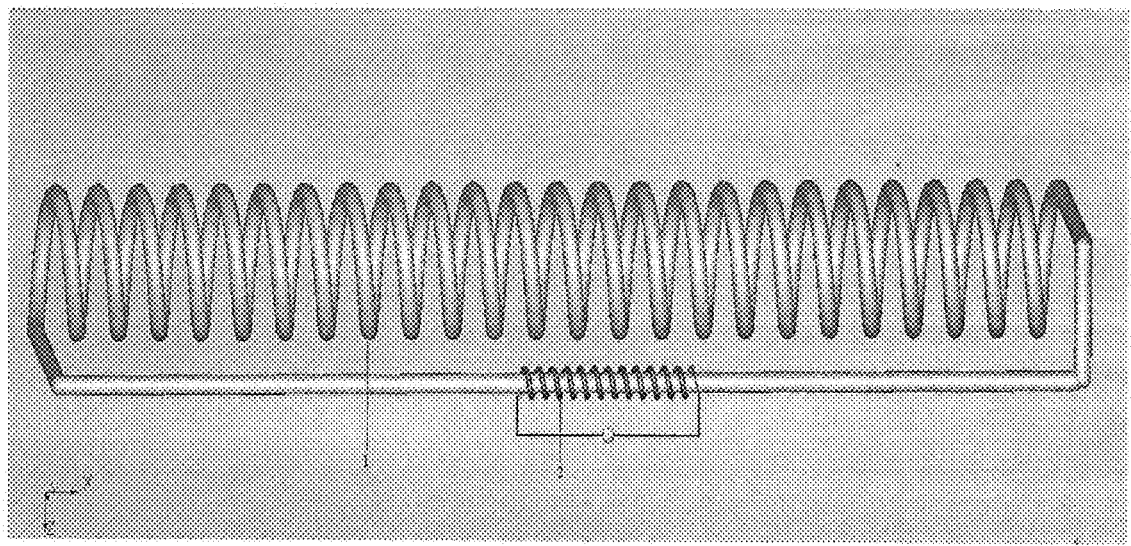
FIG. 2: Shows a schematic diagram of a closed loop of a coil made up of new free electron wire [1]. There is a copper coil [2] wound on the free arm portion of the new free electron wire to deliver electrical energy to the free electrons of the new free electron wire.

(d) The free electrons of the new free electron wire can be set into vibrating motion by winding a small copper coil on an exposed free arm of the new free electron wire. We can supply an alternating current across the copper coil to develop a changing flux, which in turn will set the free electrons in vibration which in turn will generate the required magnetic field to drive the energy of fans and motors. Here we are delivering the electrical energy to the free electrons by using the method of induction. A schematic diagram of the connection is shown in FIG. 2.

Figure 3:
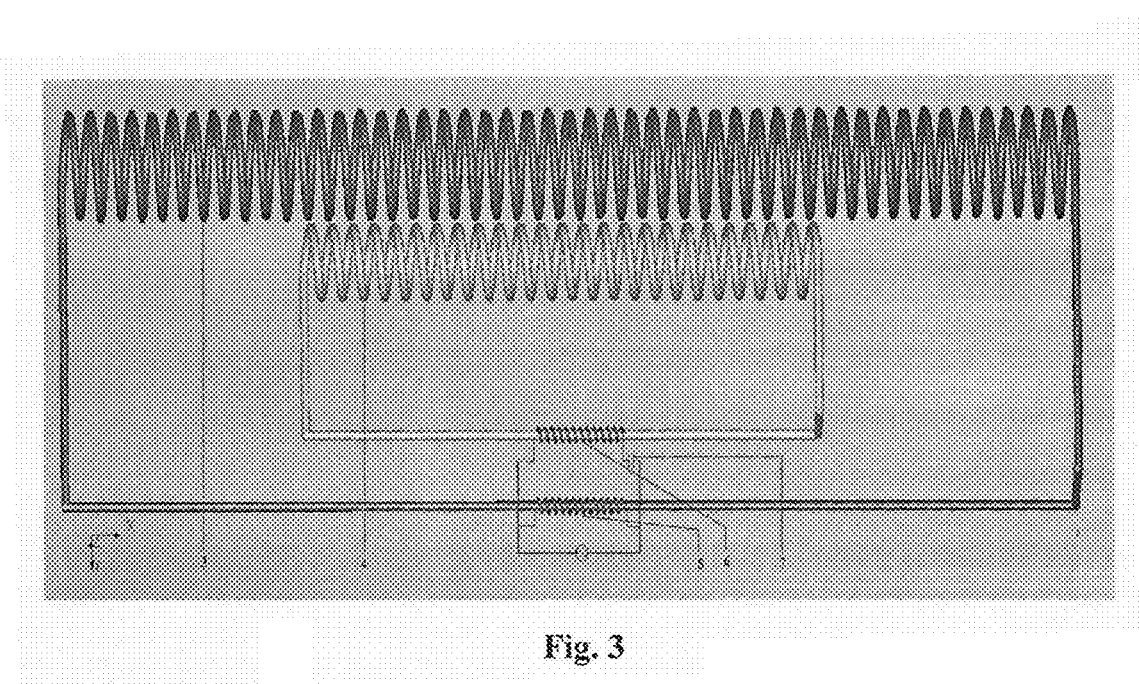
FIG. 3: Shows a schematic diagram of the coil set-up, of a normal ceiling fan. Here we have the running coil or primary coil [3] of the fan made up of new free electron wire. On a free arm portion of the primary or running coil there is a copper coil [5] to deliver electrical energy to the free electrons of the new free electron wire, running coil [3]. The starting coil or the auxiliary coil [4] is also made up of new free electron wire. There is also another copper coil [6], to supply electrical energy to the free electrons inside the core of the free electron wire, starting or auxiliary coil [4].

(e) In case of ceiling fans and single phase motors the capacitor can be connected in series with the copper coil on the free exposed arm of the new free electron wire starting coil, to develop the required phase shift of the alternating current flowing through this coil with respect to the alternating current flowing through the running coil. This will make the magnetic flux generated by the copper coil to set the free electrons of the running coil in a vibrating motion, which will be in phase with respect to the magnetic flux generated by the copper coil to set the free electrons of the starting coil, in a vibrating motion. Hence the vibration of the free electrons in the starting coil and in the running coil will be in phase which will develop the electromagnetic fluxes in phase. A schematic diagram of the connection for the ceiling fan is shown in FIG. 3.

(f) Electrical energy can also be delivered to the free electrons of the new free electron wire by using electrodes of metals, non-metals and semiconductors. By using several electrodes on the free exposed arm of the new free electron wire and by applying different potentials to these electrodes, the free electrons of the new free electron wire can be set into vibration.

(g) As the above calculation shows that it requires a very little current to drive the energy efficient fans and motors, hence the wire of the copper coils can be very thin and a very small coil can serve the purpose of delivering electrical energy to the free electrons of the new free electron wire. Also an additional resistive or inductive electrical or electronic circuit may need to be connected in series with the copper coils to regulate current through the coils. This is required because a large flow of current may generate huge electromagnetic flux which may turn out to be unmanageable and damage the electrical appliance.

(h) The materials of the body of the new free electron wire comprises a first group as of Silicon Oxy-Nitride ($SiO_2$—$Si_3N_4$—$SiO_2$), Silicon Dioxide ($SiO_2$), Silicon Nitride ($Si_3N_4$), Ceramic Materials, Polymers and Dielectric Material and the materials of the second group comprise Polytetrafluoro ethylene (PTFE), Perfluoro alkoxy (PFA), Fluorinated ethylene (FEP), silicon rubber. There can be several layers of multiple materials chosen from both the groups of materials to manufacture the body of the free electron wire, as per the use of the new free electron wire as shown in FIG. 4.

(g) There needs to be a metallic encapsulation at any layer of the body of the new free electron wire to filter out the electric field, as per requirement. The electric field is required to be filtered out, because it may cause huge electrostatic repulsion between the windings of the new free electron wire. But we need the magnetic field to make the fans and the motors operate properly. To do this we may use non magnetic metals such as copper or aluminium, for the encapsulation. Also we may use a ferromagnetic material to keep the whole electromagnetic field remain confined within the new free electron wire.

Figure 1:
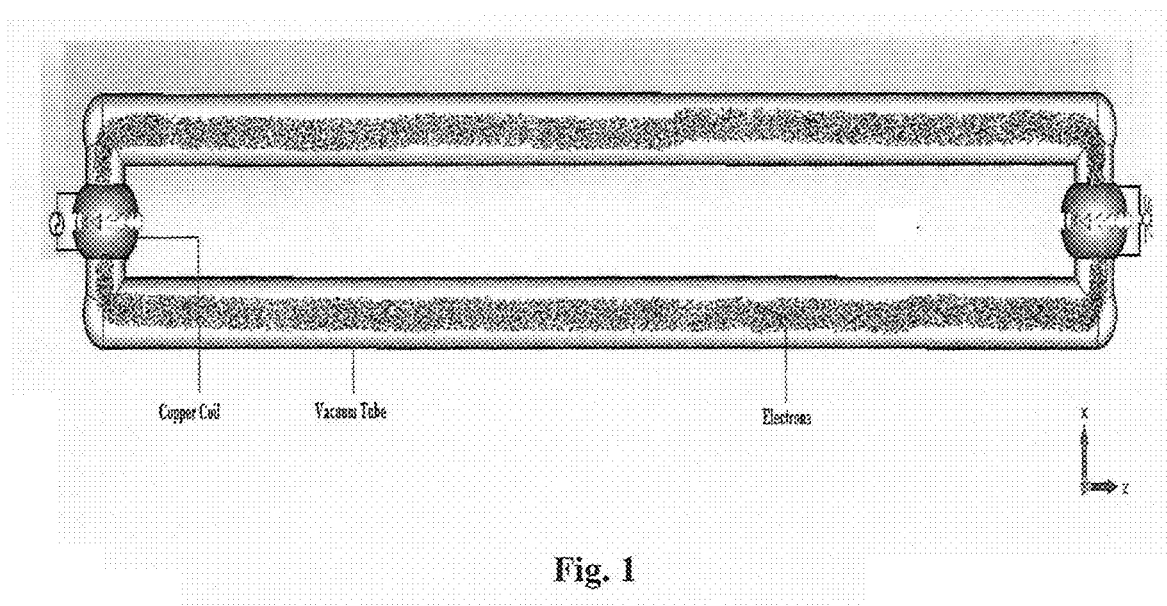
FIG. 1: This figure shows a full loop of the new free electron wire with free electrons trapped inside the vacuum space of the new free electron wire. There are two copper coils at opposite sides of the loop. An alternating current is supplied across the copper coil at one end of the free electron wire loop. A second copper coil is there on the other end of the loop to recollect the electrical energy to deliver the energy to drive any electrical device.

(h) This must always be kept in mind that while using the new free electron wire, the wire must always form a closed loop. The free electrons will move to and from a clock wise and anti clock wise direction. A schematic diagram of the whole working system along with the two identical copper coils to deliver electrical energy and to recollect that electrical energy, has been shown if FIG. 1.

CONCLUSION

An energy efficient fan or motor comprises all their usual components, except that their metal wire coils are being replaced by coils or straight wires of new free electron wire, wherein the free electrons or charged particles or ions of the new free electron wire generates the required electromagnetic field to drive these energy efficient fans or motors, wherein there are coils wound over new free electron wire or electrodes to deliver energy to the free electrons or charged particles or ions of the new free electron wire, wherein there are layer(s) of encapsulation over the new free electron wire, of metals, non-metals and semiconductors, wherein the materials of the body of the new free electron wire comprises any number of materials from a first group Silicon Oxy-Nitride ($SiO_2$—$Si_3N_4$—$SiO_2$), Silicon Dioxide ($SiO_2$), Silicon Nitride ($Si_3N_4$), Ceramic Materials, Polymers or Dielectric Materials and any number of materials from the materials of a second group comprising Polytetrafluoro ethylene (PTFE), Perfluoro alkoxy (PFA), Fluorinated ethylene (FEP) or Silicon Rubber.

I claim(s):

1. An energy efficient fan or motor comprises all their usual components, except that their metal wire coils are being replaced by coils or straight wires of new free electron wire,
   (i) wherein the free electrons or charged particles or ions of the new free electron wire generates the required electromagnetic field to drive these energy efficient fans or motors,
   (ii) wherein there are coils wound over new free electron wire or electrodes to deliver energy to the free electrons or charged particles or ions of the new free electron wire,
   (iii) wherein there are layer(s) of encapsulation over the new free electron wire, of metals, non-metals and semiconductors,
   (iv) wherein the materials of the body of the new free electron wire comprises any number of materials from a first group Silicon Oxy-Nitride ($SiO_2$—$Si_3N_4$—$SiO_2$), Silicon Dioxide ($SiO_2$), Silicon Nitride ($Si_3N_4$), Ceramic Materials, Polymers or Dielectric Materials and any number of materials from the materials of a second group comprising Polytetrafluoro ethylene (PTFE), Perfluoro alkoxy (PFA), Fluorinated ethylene (FEP) or Silicon Rubber.

2. An energy efficient fan or motor as in claim 1 wherein a special connector to deliver energy to the free electrons of the new free electron wire may be of metals, non metals and semiconductor wire coil(s) or of an electrode of metals, non-metals and semiconductors.

3. The body of the new free electron wire for the coils of the energy efficient fans or motors may be formed of several layers of multiple materials chosen randomly from both the groups of the materials, as in claim 1.

4. Any electrical car electronic device like that of a capacitor, may he connected directly or indirectly with the new free electron wire coil of the energy efficient fans or motors, as in claim 1, through the special connectors.

5. The amount of electricity required to drive the energy efficient fans or motors, as in claim 1, can be regulated by an additional electronic or electrical resistive or inductive circuit or a combination of both.

* * * * *